(12) United States Patent
Jang et al.

(10) Patent No.: US 11,709,404 B2
(45) Date of Patent: Jul. 25, 2023

(54) DISPLAY DEVICE AND METHOD OF MANUFACTURING THE SAME

(71) Applicant: Samsung Display Co., Ltd., Yongin-Si (KR)

(72) Inventors: Hyelim Jang, Hwaseong-si (KR); Young Gu Kim, Yongin-si (KR); Jiyun Park, Hwaseong-si (KR); Jongho Son, Seoul (KR); Jongmin Ok, Hwaseong-si (KR); Sun-Young Chang, Seoul (KR); Baekkyun Jeon, Yongin-si (KR); Kyungseon Tak, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/021,985

(22) Filed: Sep. 15, 2020

(65) Prior Publication Data

US 2021/0103192 A1 Apr. 8, 2021

(30) Foreign Application Priority Data

Oct. 7, 2019 (KR) ........................ 10-2019-0123815

(51) Int. Cl.
*G02F 1/1362* (2006.01)
*G02F 1/1335* (2006.01)

(52) U.S. Cl.
CPC .. *G02F 1/136286* (2013.01); *G02F 1/133514* (2013.01); *G02F 1/136277* (2013.01); *G02F 2201/123* (2013.01); *G02F 2202/022* (2013.01); *G02F 2202/42* (2013.01)

(58) Field of Classification Search
CPC .................................................. G02F 2202/42
See application file for complete search history.

(56) References Cited

U.S. PATENT DOCUMENTS

| | | | | |
|---|---|---|---|---|
| 5,734,456 A | * | 3/1998 | Takao | G02B 5/201 349/110 |
| 2004/0012554 A1 | | 1/2004 | Song et al. | |
| 2005/0089642 A1 | * | 4/2005 | Adams | C08G 77/58 427/384 |
| 2006/0115982 A1 | * | 6/2006 | Morisue | H01L 21/76838 257/E21.174 |

(Continued)

FOREIGN PATENT DOCUMENTS

| | | | |
|---|---|---|---|
| KR | 20030055125 A | * | 7/2003 |
| KR | 20030073006 A | * | 9/2003 |

(Continued)

*Primary Examiner* — Alexander P Gross
(74) *Attorney, Agent, or Firm* — Innovation Counsel LLP

(57) ABSTRACT

A display device includes a base layer, a first pixel transistor, a first gate line, a first data line electrically connected to the first pixel transistor, a first pixel electrode electrically connected to the first pixel transistor and overlapping the first data line in a plan view, and a porous layer. The porous layer is disposed between the first data line and the first pixel electrode and includes a matrix including a polymer resin and a plurality of void portions defined in the matrix. The display device is capable of displaying a sharp image because the porous layer alleviates or prevents a crosstalk between the first data line and the first pixel electrode.

20 Claims, 11 Drawing Sheets

(56) References Cited

U.S. PATENT DOCUMENTS

| | | | |
|---|---|---|---|
| 2006/0116000 A1* | 6/2006 | Yamamoto | H01L 21/7682 438/795 |
| 2007/0020825 A1* | 1/2007 | Cho | H01L 27/1248 438/151 |
| 2008/0030833 A1* | 2/2008 | Park | G02F 1/133514 359/259 |
| 2010/0130672 A1 | 5/2010 | Sano et al. | |
| 2012/0218322 A1* | 8/2012 | Shiomi | G02F 1/136286 345/690 |
| 2013/0134540 A1* | 5/2013 | Maeda | H01L 27/14621 438/69 |
| 2017/0242306 A1* | 8/2017 | Chang | H01L 27/3244 |
| 2017/0293190 A1* | 10/2017 | Kim | G02F 1/136227 |
| 2018/0138259 A1* | 5/2018 | Kim | H01L 27/3262 |

FOREIGN PATENT DOCUMENTS

| | | |
|---|---|---|
| KR | 10-0608200 B1 | 8/2006 |
| KR | 10-0712291 B1 | 4/2007 |
| KR | 10-0890022 B1 | 3/2009 |
| KR | 10-1157730 B1 | 6/2012 |

\* cited by examiner

DISPLAY DEVICE AND METHOD OF MANUFACTURING THE SAME

CROSS-REFERENCE TO RELATED APPLICATION

This U.S. non-provisional patent application claims priority under 35 U.S.C. § 119 of Korean Patent Application No. 10-2019-0123815, filed on Oct. 7, 2019, the disclosure of which is hereby incorporated by reference in its entirety.

BACKGROUND

1. Field of Disclosure

The present disclosure relates to a display device and a method of manufacturing the same. More particularly, the present disclosure relates to a display device capable of displaying a sharp image and a method of manufacturing the display device.

2. Description of the Related Art

Various display devices are being developed for different multimedia devices such as a television set, a mobile phone, a tablet computer, a navigation device, and a game device.

A display device may include two substrates facing each other and a light-emission control layer disposed between the two substrates to control an emission of light. For instance, the display device includes a liquid crystal layer or a light emitting layer as the light-emission control layer. The display device applies voltages to electric field generating electrodes such as a pixel electrode and a common electrode to control the emission of the light.

A parasitic capacitance may occur between a data line and a pixel electrode of the display device. The parasitic capacitance can cause a variation in voltage of the pixel electrode, and as a result, brightness of the corresponding pixel may be changed deteriorating a sharpness of an image displayed through the display device.

SUMMARY

The present disclosure provides a display device capable of displaying a sharp image.

The present disclosure provides a method of manufacturing the display device capable of displaying the sharp image.

According to an embodiment of the inventive concept, a display device includes a base layer, a first pixel transistor disposed on the base layer, a first gate line electrically connected to the first pixel transistor, a first data line electrically connected to the first pixel transistor, a first pixel electrode electrically connected to the first pixel transistor and overlapping the first data line in a plan view, and a porous layer disposed between the first data line and the first pixel electrode. The porous layer includes a matrix including a polymer resin and a plurality of void portions defined in the matrix.

The plurality of void portions may have a volume ratio equal to or greater than about 10% and equal to or smaller than about 50% of a total volume including the matrix and the plurality of void portions.

The polymer resin may include at least one of a polysiloxane-based resin and a polyacrylic-based resin.

The porous layer may have a dielectric constant equal to or smaller than about 2.7.

The display device may further include: a second pixel electrode spaced apart from the first pixel electrode in a first direction, a second pixel transistor electrically connected to the second pixel electrode, a second gate line electrically connected to the second pixel transistor, and a second data line electrically connected to the second pixel transistor. The second data line may overlap the first pixel electrode and the second pixel electrode in the plan view.

The display device may further include: a first insulating layer, and a second insulating layer. The first pixel transistor may include: a control electrode disposed on the base layer and extending from the first gate line, an input electrode extending from the first data line, and an output electrode electrically connected to the first pixel electrode. The first insulating layer may cover the control electrode, the second insulating layer may be disposed on the first insulating layer to insulate the first data line, the input electrode, and the output electrode, and the porous layer may be disposed on the second insulating layer.

The porous layer may further include an inorganic layer disposed directly on at least one of an upper portion and a lower portion of the matrix.

The inorganic layer may include at least one of silicon oxide, silicon nitride, or silicon oxynitride.

The second insulating layer may be a color filter that includes at least one of a pigment and a dye.

The display device may further include a liquid crystal layer disposed on the first pixel electrode.

The display device may further include a layer disposed on the first pixel electrode and including a light emitting material.

The porous layer may have a thickness equal to or greater than about 1 μm and equal to or smaller than about 5 μm.

A volume of each of the plurality of void portions may be equal to or greater than about 0.03 $\mu m^3$ and equal to or smaller than about 0.6 $\mu m^3$.

According to an embodiment of the inventive concept, a display device includes a base layer, a transistor disposed on the base layer, a pixel electrode electrically connected to the transistor, and a porous layer disposed between the transistor and the pixel electrode. The porous layer includes a matrix including a polymer resin and a plurality of void portions defined in the matrix. The plurality of void portions have a volume ratio equal to or greater than about 10% and equal to or smaller than about 50% of a total volume including the matrix and the plurality of void portions.

The display device may further include a gate line electrically connected to the transistor and a data line electrically connected to the transistor and overlapping the pixel electrode in a plan view.

The polymer resin may include a polysiloxane-based resin.

According to an embodiment of the inventive concept, a method of manufacturing a display device includes: providing a first substrate including a base layer, a first pixel transistor disposed on the base layer, a first gate line electrically connected to the first pixel transistor, and a first data line electrically connected to the first pixel transistor, providing a porous layer on the first substrate, and providing a first pixel electrode electrically connected to the first pixel transistor and overlapping the first data line in a plan view. The providing of the porous layer includes polymerizing a base resin and a porogen to form a preliminary porous layer and removing the porogen from the preliminary porous layer to define a void portion.

The porogen may have a volume equal to or greater than about 0.03 $\mu m^3$ or equal to or smaller than about 0.6 $\mu m^3$.

The porogen may have a weight ratio equal to or greater than about 10 weight percentage (wt %) and equal to or smaller than about 50 wt % of a total weight including the base resin and the porogen.

The method may further include: providing a second pixel electrode spaced apart from the first pixel electrode in a first direction, a second pixel transistor electrically connected to the second pixel electrode, a second gate line electrically connected to the second pixel transistor, and a second data line electrically connected to the second pixel transistor and overlapping the first pixel electrode in the plan view.

According to the above, the display device is capable of displaying a sharp image using the porous layer that alleviates or prevents a crosstalk between signals.

In addition, the display device that displays the sharp image may be manufactured according to the method described above.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
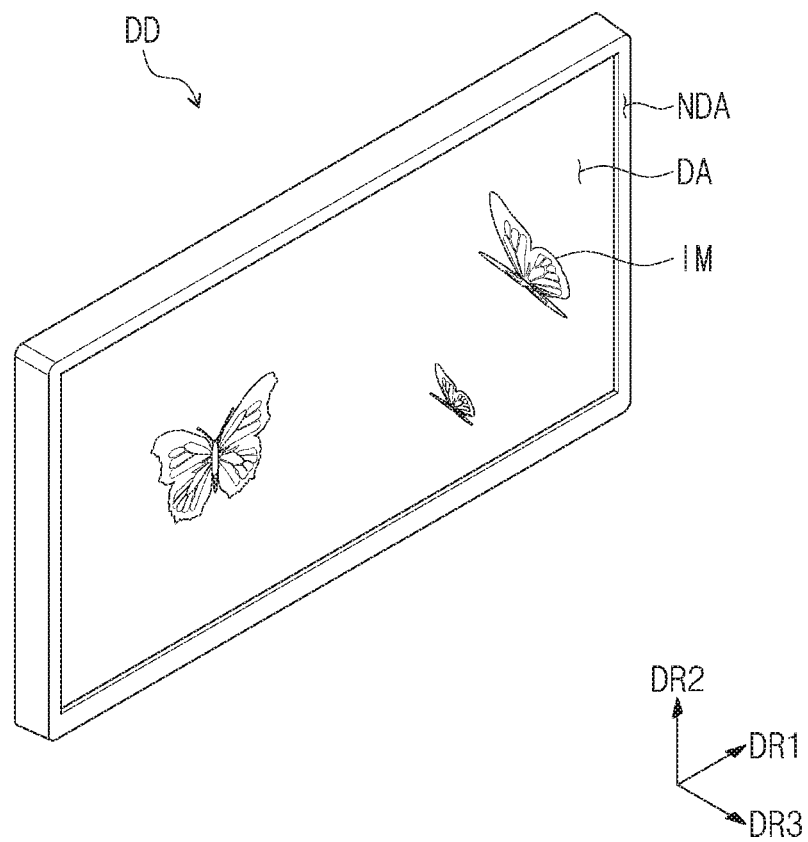
FIG. 1 is a perspective view showing a display device according to an exemplary embodiment.

In the following descriptions, it will be understood that when an element or layer is referred to as being "on," "connected to" or "coupled to" another element or layer, it can be directly on, connected or coupled to the other element or layer, or one or more intervening elements or layers may be present.

Like numerals refer to like elements throughout the present disclosure. In the drawings, the thickness, ratio, and dimension of components may be exaggerated for effective and convenient description of their technical aspects.

As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosure. As used herein, the singular forms, "a," "an," and "the" are intended to include the plural forms as well, unless the context clearly indicates otherwise.

Spatially relative terms, such as "beneath," "below," "lower," "above," "upper," and the like, may be used herein for ease of description to describe one element or feature's relationship to another element(s) or feature(s) as illustrated in the figures. The terms are described with reference to the directions indicated in the figures.

In addition, the term "on" in the following descriptions may include a case where a component/element is disposed at a lower part as well as an upper part.

In the following descriptions, the expression that component "B" is directly disposed on component "A" may mean that no intervening elements, such as an adhesive layer or a pressure sensitive adhesive layer, are present between the component "B" and the component "A". For example, the component "B" may be formed on a surface provided by the component "A" through successive processes after the component "A" is formed.

Unless otherwise defined, terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including," when used in the present disclosure, specify the presence of stated features, integers, steps, operations, elements, and/or, components, but do not preclude the presence or addition of one or more other features, integers, steps, operations, elements, components, and/or, groups thereof.

Hereinafter, the present disclosure will be explained in detail with reference to the accompanying drawings.

FIG. 1 is a perspective view showing a display device DD according to an exemplary embodiment. Referring to FIG. 1, the display device DD may include a display area DA and a non-display area NDA. The display area DA may correspond to an area through which an image IM is displayed. In FIG. 1, butterflies are shown as a representative example of the image IM. The image IM may not be displayed through the non-display area NDA. Pixels (not shown) may be arranged in the display area DA and may not be arranged in the non-display area NDA. The pixels may indicate valid pixels that provide the image IM.

The display area DA may be substantially parallel to a surface defined by a first directional axis DR1 and a second directional axis DR2. A third directional axis DR3 may indicate a normal direction of the display area DA, i.e., a thickness direction of the display device DD. Front (or upper) and rear (or lower) surfaces of each member described hereinafter may be distinguished from each other by the third directional axis DR3. However, directions indicated by the first, second, and third directional axes DR1, DR2, and DR3 are relative to each other and may be changed to other directions. Hereinafter, first, second, and third directions are respectively indicated by the first, second, and third directional axes DR1, DR2, and DR3 and are assigned with the same reference numerals.

The display device DD may be applied to or implemented in a large-sized electronic device such as a television set, a monitor, or an outdoor billboard, and a small and medium-sized electronic device such as a personal computer, a notebook computer, a personal digital assistant, a navigation device, a game device, a mobile electronic device, and a camera. However, these are merely exemplary, and the display device DD may be applied to or implemented in other electronic devices without departing from the concept of the present disclosure.

A bezel area of the display device DD may be defined by the non-display area NDA. The non-display area NDA may be adjacent to the display area DA. In the present example, the non-display area NDA may surround the display area DA, however, the display area DA and the non-display area NDA should not be limited thereto or thereby. The display area DA and the non-display area NDA may have shapes that are designed relative to each other. According to another exemplary embodiment, the non-display area NDA may be omitted.

Figure 2:
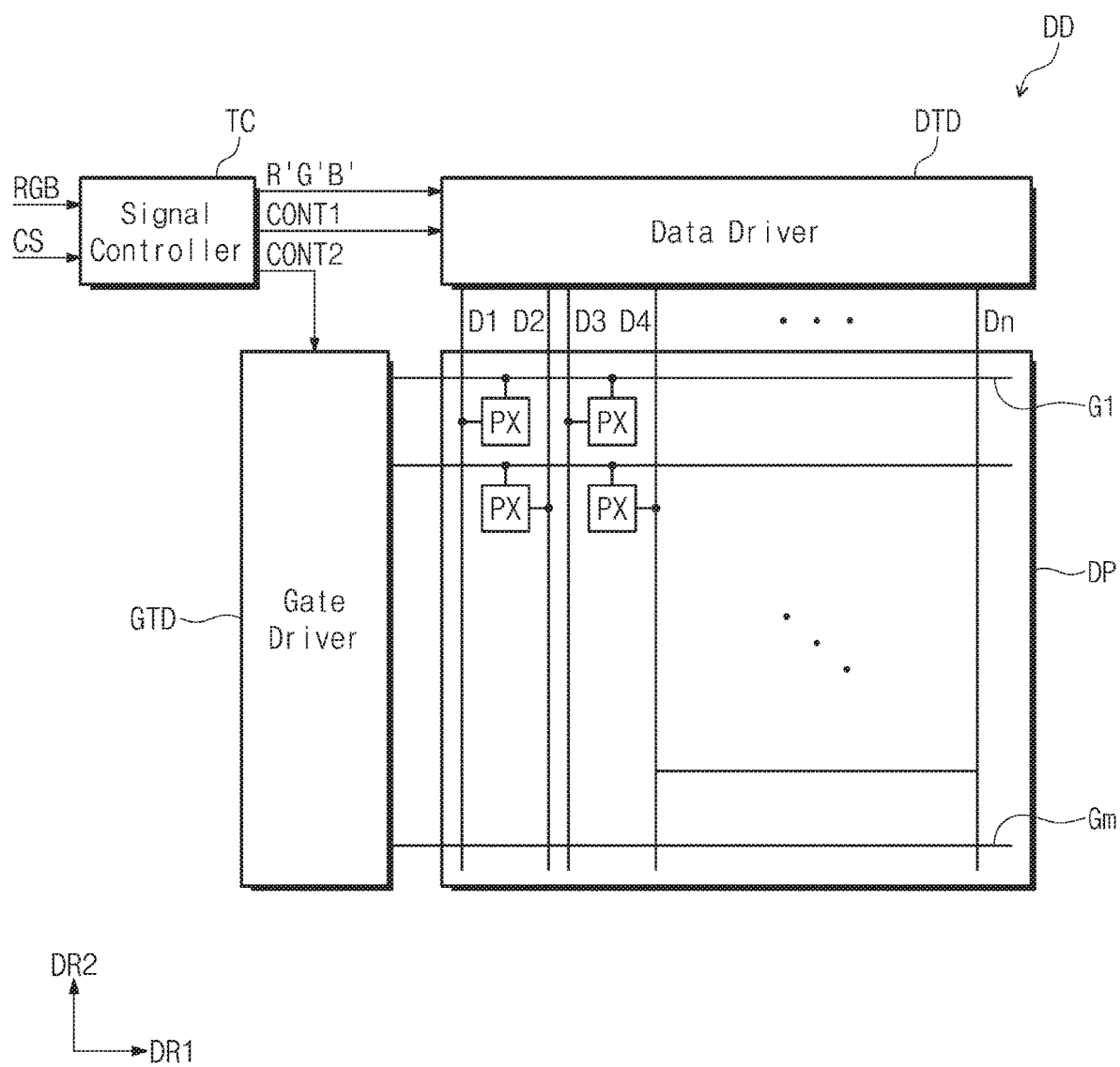
FIG. 2 is a block diagram of a display device according to an exemplary embodiment.

FIG. 2 is a block diagram of the display device DD. The display device DD includes a signal controller TC, a gate driver GTD, a data driver DTD, and a display panel DP.

The display panel DP is electrically connected to the gate driver GTD and the data driver DTD and operates in response to electrical signals provided thereto from the gate driver GTD and the data driver DTD. The display panel DP should not be particularly limited, and various panels, such as an organic light emitting display panel, a liquid crystal display panel, a plasma display panel, an electrophoretic display panel, and an electrowetting display panel, may be used as the display panel DP. In the present embodiment, a liquid crystal display device including a liquid crystal display element is used as a representative example.

The display device DD may further include a backlight unit (not shown) for providing light to the display panel DP and an optical member (not shown) including a polarizing plate. The display panel DP may control an amount of light generated by the backlight unit and transmitting therethrough to display the image IM, however, this is merely exemplary. In a case where the organic light emitting display panel is used as the display panel DP, the backlight unit may be omitted.

The display panel DP may include signal lines G1 to Gm and D1 to Dn and a plurality of pixels PX connected to the signal lines G1 to Gm and D1 to Dn. The signal lines G1 to Gm and D1 to Dn may include a plurality of gate lines G1 to Gm and a plurality of data lines D1 to Dn.

The gate lines G1 to Gm extend in the first direction DR1 and are arranged in the second direction DR2 to connect the gate driver GTD to the pixels PX. The gate lines G1 to Gm provide gate signals provided from the gate driver GTD to the corresponding pixels PX.

The data lines D1 to Dn extend in the second direction DR2 and are arranged in the first direction DR1. The data lines D1 to Dn connect the data driver DTD to the pixels PX. The data lines D1 to Dn provide data signals provided from the data driver DTD to the corresponding pixels PX. The data lines D1 to Dn are insulated from the gate lines G1 to Gm while crossing the gate lines G1 to Gm.

Each pixel PX may be connected to a corresponding gate line among the gate lines G1 to Gm and a corresponding data line among the data lines D1 to Dn. Each pixel PX may include a thin film transistor (not shown) and a liquid crystal capacitor (not shown) that is connected to the thin film transistor. The pixels PX may display the image IM by controlling an amount of electric charges stored in the liquid crystal capacitor.

The signal controller TC applies electrical signals to the gate driver GTD and the data driver DTD to control an operation of the gate driver GTD and the data driver DTD. The signal controller TC receives input image signals RGB, converts the input image signals RGB to image data R'G'B' that are suitable for the operation of the display panel DP, and outputs the image data R'G'B'. In addition, the signal controller TC receives various control signals CS, e.g., a vertical synchronization signal, a horizontal synchronization signal, a main clock signal, and a data enable signal, and outputs first and second control signals CONT1 and CONT2.

The data driver DTD receives the first control signal CONT1 and the image data R'G'B' from the signal controller TC. The data driver DTD converts the image data R'G'B' to data voltages and provides the data voltages to the data lines D1 to Dn. The first control signal CONT1 may include a horizontal start signal that indicates a start of the operation of the data driver DTD, an inversion signal that inverts a polarity of the data voltages, and an output indicating signal that determines an output timing of the data voltages from the data driver DTD.

The gate driver GTD receives the second control signal CONT2 from the signal controller TC and outputs gate signals to the gate lines G1 to Gm in response to the second control signal CONT2. The second control signal CONT2 may include a vertical start signal that indicates a start of the operation of the gate driver GTD, a gate clock signal that determines an output timing of the gate voltage, and an output enable signal that determines an ON-pulse width of the gate voltage.

Figure 3:
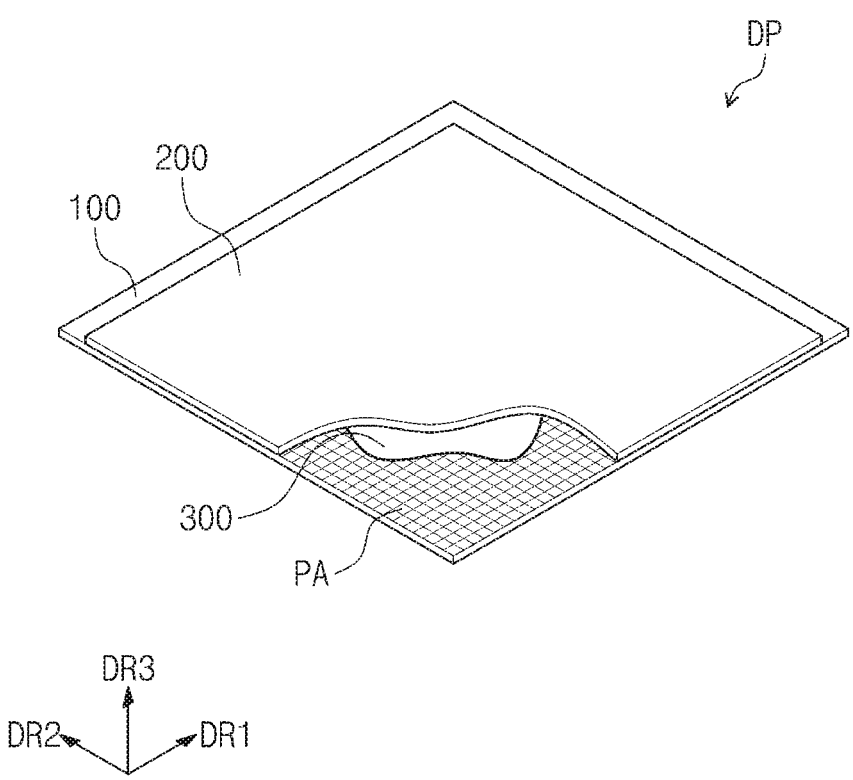
FIG. 3 is a perspective view showing a portion of a display panel according to an exemplary embodiment.

FIG. 3 is a perspective view showing a portion of the display panel DP according to an exemplary embodiment. The display panel DP may include a first substrate 100, a second substrate 200, and a liquid crystal layer 300. The first substrate 100 may include a plurality of pixel areas PA. Each of the pixels PX may be arranged in a corresponding pixel area PA. In the present exemplary embodiment, the pixel areas PA may correspond to areas through which lights generated by the corresponding pixels PX are displayed.

The liquid crystal layer 300 may be disposed between the first substrate 100 and the second substrate 200. The liquid crystal layer 300 may include liquid crystal molecules (not shown). The liquid crystal molecules may include a material whose alignment is controlled by an electric field formed in the pixel areas PA.

Figure 4:
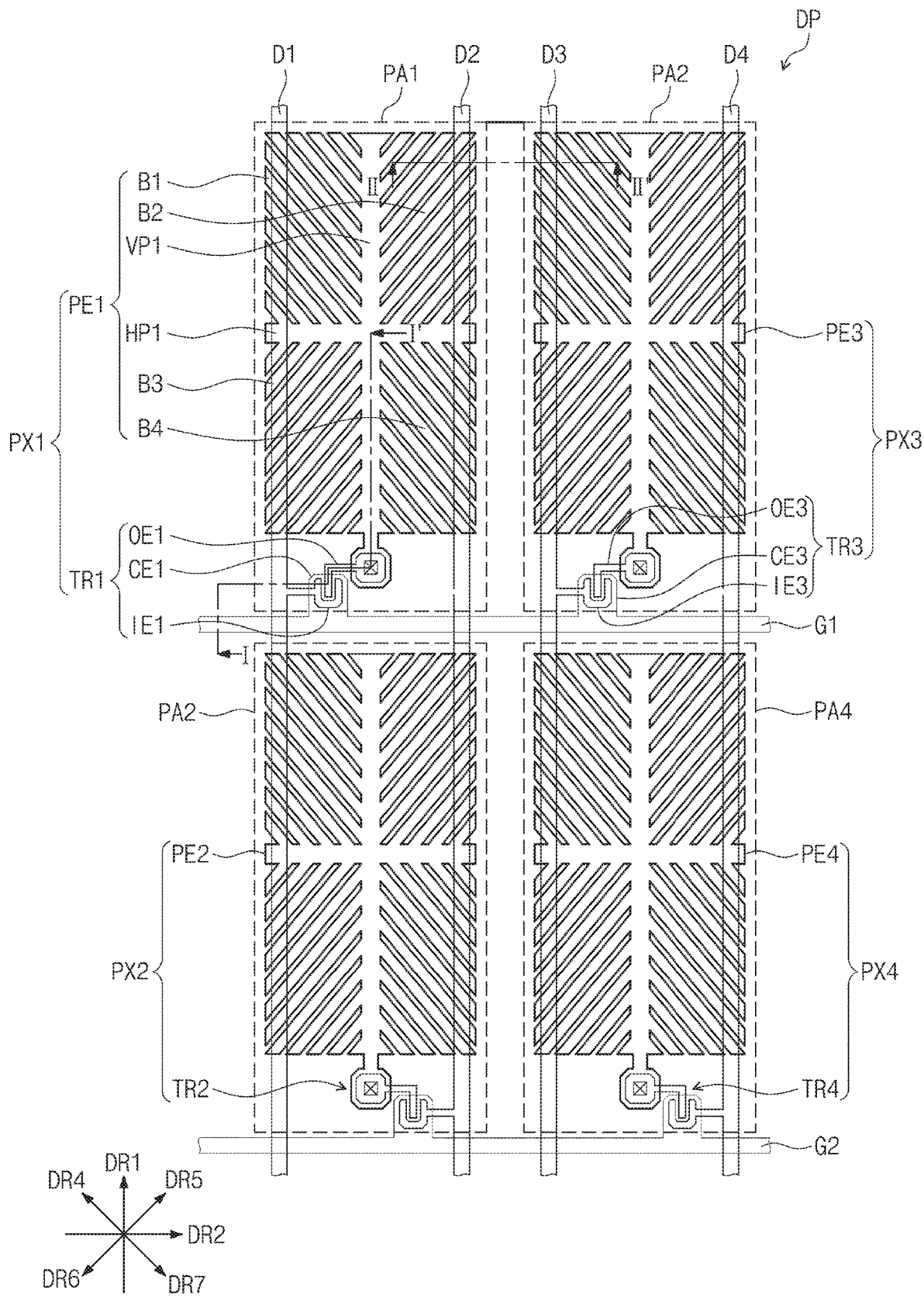
FIG. 4 is a plan view showing a portion of a display panel according to an exemplary embodiment.
Figure 5:
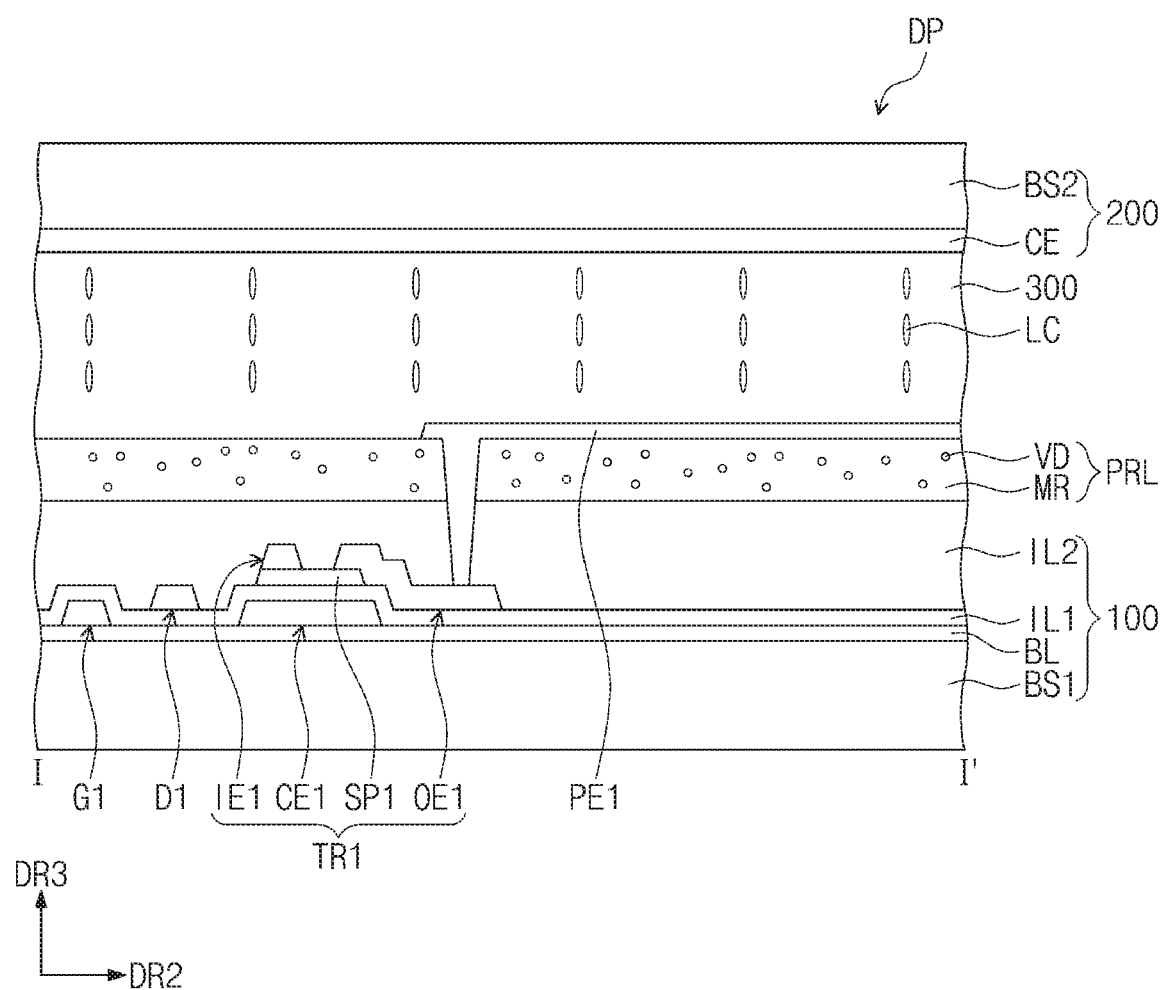
FIG. 5 is a cross-sectional view showing a display panel taken along a line I-I' of FIG. 4.
Figure 6:
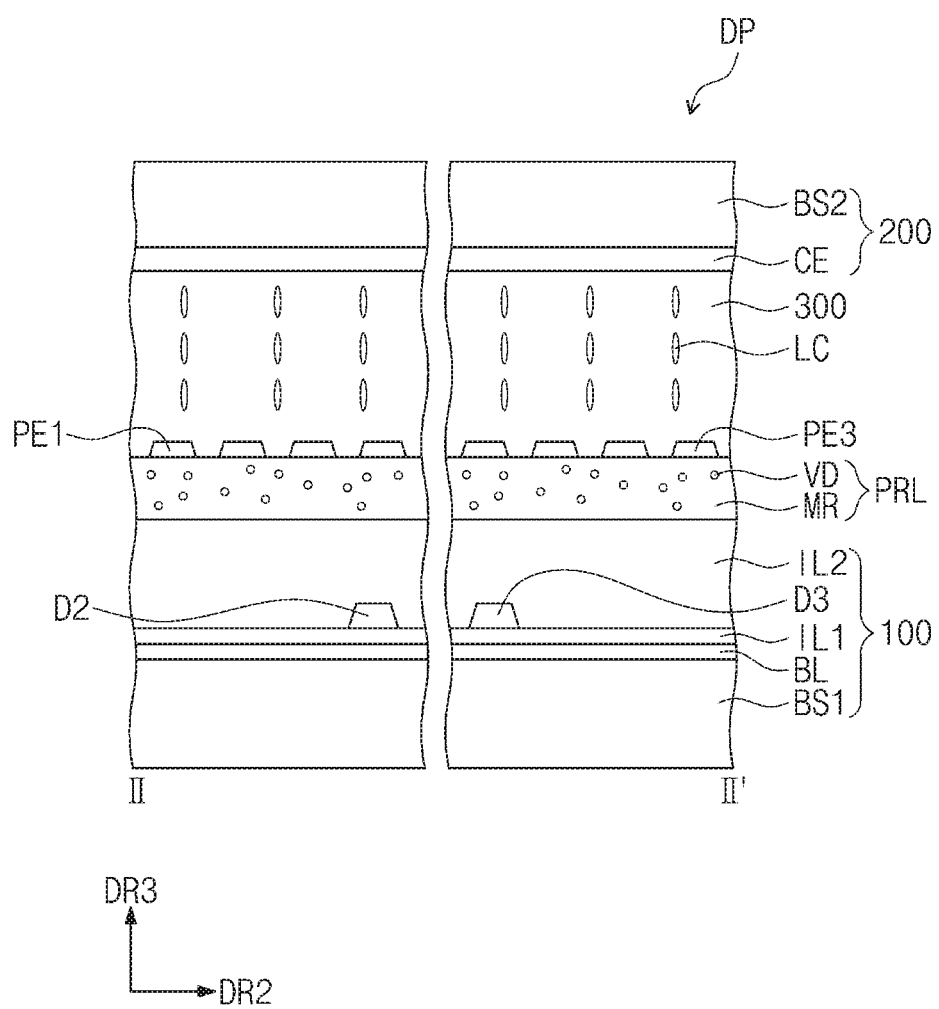
FIG. 6 is a cross-sectional view showing a display panel taken along a line II-II' of FIG. 4.

FIG. 4 is a plan view showing a portion of the display panel DP according to an exemplary embodiment. FIG. 5 is a cross-sectional view taken along a line I-I' of FIG. 4 to show the display panel DP. FIG. 6 is a cross-sectional view taken along a line II-II' of FIG. 4 to show the display panel DP.

For convenience of explanation, FIG. 4 shows a portion of the first substrate 100 that corresponds to four pixel areas PA1, PA2, PA3, and PA4 that are adjacent to each other among the pixel areas PA. Hereinafter, the exemplary embodiment of the present disclosure will be described in detail with reference to FIGS. 4 and 5.

Four pixels PX1, PX2, PX3, and PX4 are respectively disposed in the four pixel areas PA1, PA2, PA3, and PA4. Each of the four pixels PX1, PX2, PX3, and PX4 is connected to a corresponding gate line and a corresponding data line. More specifically, among the four pixels PX1, PX2, PX3, and PX4, a first pixel PX1 is connected to a first gate line G1 and a first data line D1, a second pixel PX2 is connected to a second gate line G2 and a second data line D2, a third pixel PX3 is connected to the first gate line G1 and a third data line D3, and a fourth pixel PX4 is connected to the second gate line G2 and a fourth data line D4. However, the present exemplary embodiment should not be limited thereto or thereby. For example, the second data line D2 and the fourth data line D4 may be omitted, and the second pixel PX2 and the fourth pixel PX4 may be respectively connected to the first data line D1 and the third data line D3. In the present exemplary embodiment, both the first data line D1 and the second data line D2 overlap a first pixel electrode PE1 in a plan view, however, one of the first data line D1 and the second data line D2 may not overlap the first pixel electrode PE1 in the plan view, or both the first data line D1 and the second data line D2 may not overlap the first pixel electrode PE1 in the plan view.

Hereinafter, for the convenience of explanation, one pixel area PA1 (hereinafter, referred to as a "first pixel area") among the four pixel areas PA1, PA2, PA3, and PA4 will be described.

The first pixel area PA1 may correspond to an area through which light generated by the first pixel PX1 is displayed. Other pixels having a structure corresponding to that of the first pixel PX1 may be disposed in the corresponding pixel areas PA, respectively, however, this is merely exemplary. That is, some of the pixels PX disposed in the other pixel areas PA may have a structure different from that of the first pixel area PA1 and should not be particularly limited.

The first pixel PX1 may include a first pixel transistor TR1 and a first liquid crystal capacitor. The first liquid crystal capacitor may include the first pixel electrode PE1, a common electrode CE, and the liquid crystal layer 300.

The first substrate 100 may include a first base layer BS1, the first gate line G1, the first data line D1, the second data line D2, the first pixel transistor TR1, a plurality of insulating layers BL, IL1, and IL2, and a porous layer PRL. In another embodiment, the porous layer PRL is disposed on the first substrate 100 as a separate layer. The insulating layers may include a barrier layer BL, a first insulating interlayer IL1, and a second insulating interlayer IL2.

The first base layer BS1 may include an insulating material. The first base layer BS1 may be optically transparent. In this case, the light generated by the backlight unit (not shown) disposed under the first base layer BS1 may reach the liquid crystal layer 300 after transmitting through the first base layer BS1. For example, the first base layer BS1 may include a plastic substrate, a glass substrate, a metal substrate, or an organic/inorganic composite substrate. The substrate of the first base layer BS1 may be a flexible substrate. The plastic substrate may include at least one of an acrylic-based resin, a methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

The barrier layer BL may be disposed on the first base layer BS1. The barrier layer BL may be an inorganic layer including an inorganic material. The barrier layer BL may include at least one of aluminum oxide, titanium oxide, silicon oxide, silicon oxynitride, zirconium oxide, and hafnium oxide. The barrier layer BL may have a multi-layer structure. The barrier layer BL may prevent contaminant or moisture that may be caused by the first base layer BS1 or may inflow through the first base layer BS1 from penetrating further upward the display panel DP. According to an exemplary embodiment, the barrier layer BL may be omitted or may be replaced with a buffer layer BR (shown in FIG. 9), or both the barrier layer BL and the buffer layer BR may be disposed on the first base layer BS1.

The first gate line G1 and the second gate line G2 may be disposed between the barrier layer BL and the first insulating interlayer IL1. In a case where the barrier layer BL is omitted, the first gate line G1 and the second gate line G2 may be disposed between the first base layer BS1 and the first insulating interlayer IL1. A portion of the first gate line G1 may protrude in a direction substantially parallel to the first direction DR1 and may serve as a first control electrode CE1. The first pixel transistor TR1 may be connected to the first gate line G1 and may receive a gate signal provided from the first gate line G1.

The first insulating interlayer IL1 may cover the first gate line G1 and the first control electrode CE1. The first insulating interlayer IL1 may include an organic material and/or an inorganic material.

A first semiconductor pattern SP1 may be disposed on the first insulating interlayer IL1. The first semiconductor pattern SP1 may be spaced apart from the first control electrode CE1 with the first insulating interlayer IL1 interposed therebetween when viewed in a cross section.

The first semiconductor pattern SP1 may include a semiconductor material. For example, the semiconductor material may include at least one of amorphous silicon, polycrystalline silicon, crystalline silicon, semiconductor oxide, and semiconductor compound.

A first input electrode IE1, a first output electrode OE1, and the first data line D1 may be disposed on the first insulating interlayer IL1. The second insulating interlayer IL2 may cover the first input electrode IE1 and the first output electrode OE1. The second insulating interlayer IL2 may include an organic material and/or an inorganic material. The first input electrode IE1 and the first output electrode OE1 may be disposed between the first insulating interlayer IL1 and the second insulating interlayer IL2.

The first input electrode IE1 may correspond to a portion of the first data line D1 that protrudes in a direction substantially parallel to the second direction DR2. The first input electrode IE1 and the first output electrode OE1 may be disposed on the same layer as the first data line D1.

The first input electrode IE1 may have a shape that surrounds one end of the first output electrode OE1 in a plan view as shown in FIG. 4. The other end of the first output electrode OE1 may extend from the one end thereof and overlaps a contact hole through which the first output electrode OE1 is connected to the first pixel electrode PE1. Each of the first input electrode IE1 and the first output electrode OE1 may be disposed in the same layer as the first semiconductor pattern SP1 and may make contact directly with the first semiconductor pattern SP1.

However, this is merely exemplary, and the first input electrode IE1 and the first output electrode OE1 may be disposed in a layer different from a layer in which the first semiconductor pattern SP1 is disposed and may be connected to the first semiconductor pattern SP1 through a separate contact hole. The first pixel transistor TR1 according to the exemplary embodiment of the present disclosure may have a variety of different structures and should not be particularly limited to the structure of the present example.

The porous layer PRL may be disposed on the second insulating interlayer IL2. The porous layer PRL may include a matrix MR and a void portion VD. Detailed descriptions of the porous layer PRL according to the exemplary embodiment will be described later.

The first pixel electrode PE1 may be disposed on the second insulating interlayer IL2. In the plan view, the first pixel electrode PE1 and a second pixel electrode PE2 may be disposed to be spaced apart from each other with the first gate line G1 interposed therebetween in the first direction DR1. Similarly, a third pixel electrode PE3 and a fourth pixel electrode PE4 may be disposed to be spaced apart from the first pixel electrode PE1 and the second pixel electrode PE2 in the second direction DR2 that crosses the first direction DR1.

The first pixel electrode PE1 may be connected to the first pixel transistor TR1 via a contact hole that penetrates through the porous layer PRL and the second insulating interlayer IL2. The first pixel electrode PE1 may receive a voltage output through the first pixel transistor TR1.

Referring to FIG. 4, the first pixel electrode PE1 may include a first vertical portion VP1, a first horizontal portion HP1, and a plurality of branch portions B1 to B4. The first vertical portion VP1, the first horizontal portion HP1, and the plurality of branch portions B1 to B4 may be connected to each other to form the first pixel electrode PE1 having an integral shape.

The first vertical portion VP1 may extend in the first direction DR1. The first vertical portion VP1 may extend in a direction substantially parallel to the first data line D1 and the second data line D2.

The first horizontal portion HP1 may be connected to the first vertical portion VP1. The first horizontal portion HP1 may extend in the second direction DR2. The first horizontal portion HP1 may be connected to the first vertical portion VP1 while crossing the first vertical portion VP1. In the present exemplary embodiment, the first horizontal portion HP1 and the first vertical portion VP1 may cross each other at their center points, however, this is merely exemplary, and the first horizontal portion HP1 and the first vertical portion VP1 should not be particularly limited thereto or thereby. In another embodiment, the first horizontal portion HP1 may be disposed to be biased toward one end from the center point of the first vertical portion VP1, or the first vertical portion VP1 may be disposed to be biased toward one end from the center point of the first horizontal portion HP1.

The branch portions B1 to B4 may be connected to the first horizontal portion HP1 or the first vertical portion VP1. Each of the branch portions B1 to B4 may extend in a direction crossing the first direction DR1 and the second direction DR2.

The branch portions B1 to B4 may extend radially from the first horizontal portion HP1 and the first vertical portion VP1. The branch portions B1 to B4 may be divided into a plurality of branch portions depending on the direction in which the branch portions B1 to B4 extend from the first horizontal portion HP1 or the first vertical portion VP1.

For example, the branch portions B1 to B4 may be divided into first, second, third, and fourth branch portions B1, B2, B3, and B4. Slits may be defined between the first branch portions B1, between the second branch portions B2, between the third branch portions B3, and between the fourth branch portions B4. The slits may correspond to distances between the first branch portions B1, between the second branch portions B2, between the third branch portions B3, and between the fourth branch portions B4.

The first branch portions B1 may extend in the fourth direction DR4 from the first horizontal portion HP1 or the first vertical portion VP1. The first branch portions B1 may be patterns that are arranged in a direction substantially parallel to a fifth direction DR5 to be spaced apart from each other.

The second branch portions B2 may extend in the fifth direction DR5 from the first horizontal portion HP1 or the first vertical portion VP1. The second branch portions B2 may be patterns that are arranged in a direction substantially parallel to the fourth direction DR4 to be spaced apart from each other.

The third branch portions B3 may extend in a sixth direction DR6 from the first horizontal portion HP1 or the first vertical portion VP1. The third branch portions B3 may be patterns that are arranged in a direction substantially parallel to the fourth direction DR4 to be spaced apart from each other.

The sixth direction DR6 may be opposite to the fifth direction DR5. Accordingly, the third branch portions B3 may extend in a direction substantially parallel to the second branch portions B2.

The fourth branch portions B4 may extend in a seventh direction DR7 from the first horizontal portion HP1 or the first vertical portion VP1. The fourth branch portions B4 may be patterns that are arranged in a direction substantially parallel to the fifth direction DR5 to be spaced apart from each other.

The seventh direction DR7 may be opposite to the fourth direction DR4. Accordingly, the fourth branch portions B4 may extend in a direction substantially parallel to the first branch portions B1.

As the first pixel electrode PE1 includes the branch portions B1 to B4, a plurality of grayscales may be expressed in a single pixel area. In detail, the first area in which the first branch portions B1 are arranged, the second area in which the second branch portions B2 are arranged, the third area in which the third branch portions B3 are arranged, and the fourth area in which the fourth branch portions B4 are arranged may be defined as a plurality of domains distinguished from each other.

The alignment of liquid crystal molecules LC of the liquid crystal layer 300 may be changed depending on the extending directions of the first, second, third, and fourth branch portions B1, B2, B3, and B4. Therefore, the display panel DP may express various grayscales in each domain in a single pixel area and may display the image having improved color reproducibility, thereby implementing the display device DD with a high resolution. The second substrate 200 may face the first substrate 100 with the liquid crystal layer 300 interposed therebetween. The second substrate 200 may include a second base layer BS2 and the common electrode CE. The second base layer BS2 may be an insulating substrate that is optically transparent.

Referring to FIGS. 4 and 6, the first data line D1 and the second data line D2 may overlap the first pixel electrode PE1 in a plan view, and the third data line D3 and the fourth data line D4 may overlap the third pixel electrode PE3 in a plan view. In the present embodiment, the pixel electrodes respectively disposed in the pixel areas PA may overlap two corresponding data lines among the data lines D1 to Dn in a plan view.

Accordingly, a capacitance may be generated between the first pixel electrode PE1 and the first and second data lines D1 and D2, and as a result, a crosstalk may occur between the first pixel electrode PE1 and the first and second data lines D1 and D2. Due to crosstalk, a voltage variation may occur in a portion of the first pixel electrode PE1 that overlaps the first data line D1 and the second data line D2 in a plan view. As a result, a brightness of the corresponding pixel may get out of a target range, deteriorating the display quality of the display device DD.

For the same reason as mentioned above, the crosstalk may occur between the common electrode CE and the first and second data lines D1 and D2.

In addition, the crosstalk may occur between the pixel electrode PE1 and various conductive patterns included in the first substrate 100 and between the common electrode CE and the various conductive patterns in addition to the data line D1.

Since the display device DD includes the porous layer PRL, the crosstalk may be alleviated or prevented. Hereinafter, the porous layer PRL will be described in detail.

The porous layer PRL may include the matrix MR and the void portion VD as described above.

The void portion VD may be defined in the matrix MR. The void portion VD may have a variety of shapes, such as a spherical shape, a quasi-spherical shape, a polygonal shape, or a branch shape. The void portion VD may have a symmetrical shape, however, the shape of the void portion VD should not be limited thereto or thereby. That is, the void portion VD may have an asymmetrical shape. The void portion VD may be provided in a plural number in the porous layer PRL.

Since the porous layer PRL includes the void portion VD, the porous layer PRL may have a relatively low dielectric constant compared with the porous layer PRL that includes only the matrix MR without the void portion VD. For example, the porous layer PRL may have the low dielectric constant that is equal to or smaller than about 3.0 or equal to or smaller than about 2.7.

According to an exemplary embodiment, the void portion VD may have a diameter equal to or greater than about 2 nanometers and equal to or smaller than about 10 nanometers. The diameter of the void portion VD having a non-spherical shape may be measured using a spherical shape that has the same volume as the void portion VD.

According to an exemplary embodiment, the volume of the void portion VD may be within a range equal to or greater than about 0.03 $\mu m^3$ or equal to or smaller than about 0.6 $\mu m^3$. When the volume of the void portion VD is smaller than about 0.03 $\mu m^3$, the dielectric constant of the porous layer PRL may not be lowered sufficiently. When the volume of the void portion VD exceeds about 0.6 $\mu m^3$, a durability of the porous layer PRL may be compromised, or external moisture or air may enter the first substrate 100.

According to an exemplary embodiment, in a total volume of the matrix MR and the void portion VD, a volume ratio of the void portions VD may be equal to or greater than about 10% and equal to or smaller than about 50%. When the volume ratio of the void portions VD is smaller than about 10%, the dielectric constant of the porous layer PRL may not be lowered sufficiently. When the volume ratio of the void portion VD exceeds about 50%, the durability of the porous layer PRL may be compromised, or the external moisture or air may enter the first substrate 100. According to an exemplary embodiment, the porous layer PRL may have a thickness equal to or greater than about 1 μm and equal to or smaller than about 5 μm. When the thickness of the porous layer PRL is smaller than about 1 μm, the occurrence of crosstalk may not be sufficiently suppressed. When the thickness of the porous layer PRL exceeds about 5 μm, the substantially similar level for crosstalk suppression as in the case where the thickness of the porous layer PRL is equal to or greater than about 1 μm and equal to or smaller than about 5 μm may be expected, but a material cost and a processing time may increase.

The matrix MR may include a polymer resin. For instance, the matrix MR may include at least one of a polysiloxane-based resin, a polyacrylic-based resin, a polyurethane-based resin, and a polyimide-based resin. The polymer resin may include a fluorine-substituted group.

In one embodiment, the matrix MR may include the polysiloxane-based resin. Since the polysiloxane-based resin has a low dielectric constant, the polysiloxane-based resin included in the matrix MR may effectively block a noise signal generated from the data lines D1 to Dn from reaching the pixel electrode.

Figure 7:
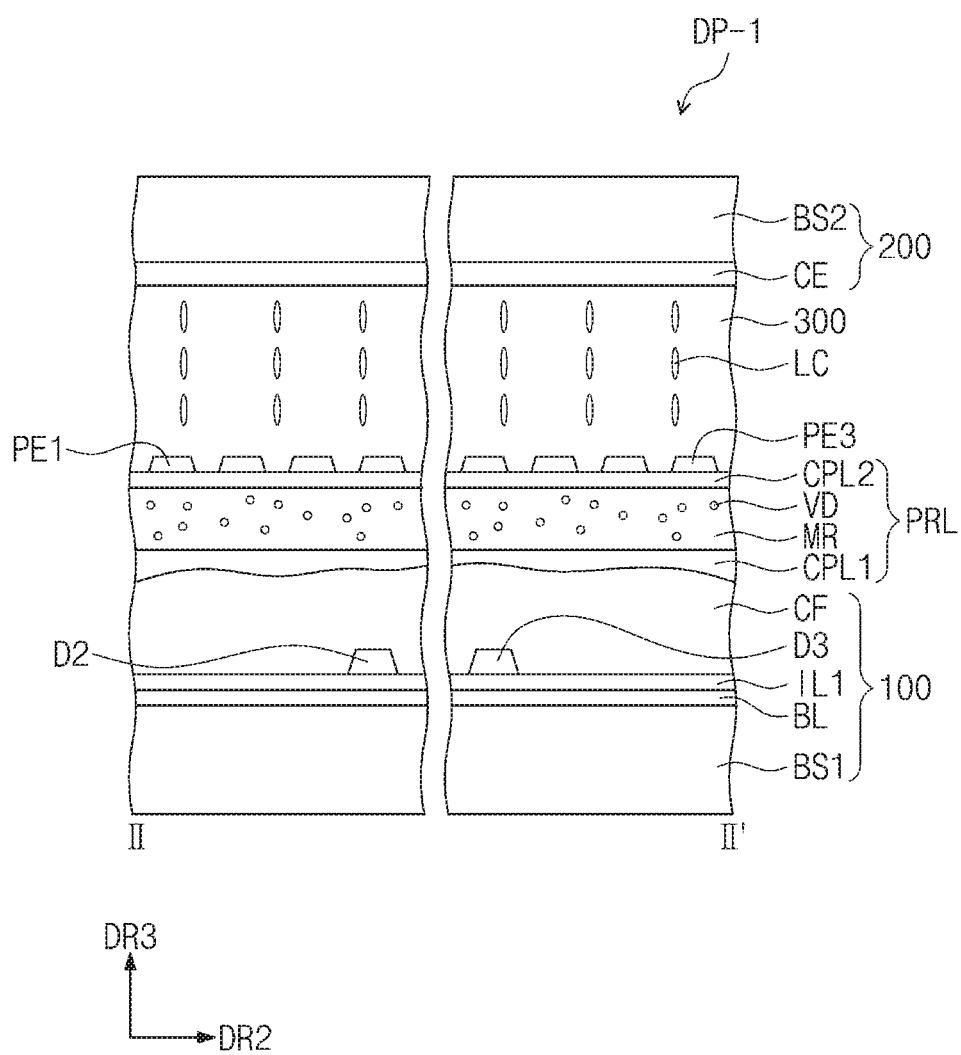
FIG. 7 is a cross-sectional view showing a display panel according to an exemplary embodiment.

FIG. 7 is a cross-sectional view showing a display panel DP-1 according to an exemplary embodiment.

Referring to FIG. 7, a porous layer PRL may further include a first inorganic layer CPL1 disposed under a matrix MR and a second inorganic layer CPL2 disposed on the matrix MR. The first inorganic layer CPL1 and the second inorganic layer CPL2 may be respectively disposed directly under and on the matrix MR. FIG. 7 shows the porous layer PRL including both the first inorganic layer CPL1 and the second inorganic layer CPL2, however, in some embodiments, only one of the first inorganic layer CPL1 and the second inorganic layer CPL2 may be disposed in the porous layer PRL. Each of the first inorganic layer CPL1 and the second inorganic layer CPL2 may include at least one of silicon oxide, silicon nitride, and silicon oxynitride.

As the porous layer PRL includes the first inorganic layer CPL1 and the second inorganic layer CPL2, the matrix MR may be prevented from chemically reacting with components disposed thereunder and/or thereon. For example, in a case where a second insulating interlayer IL2 includes an organic material and the porous layer PRL is disposed directly on the second insulating interlayer IL2, the organic material of the porous layer PRL and the organic material of the second insulating interlayer IL2 may chemically react with each other, compromising the durability of the display device DD. However, in the case where the porous layer PRL includes the first inorganic layer CPL1, the chemical reaction of the organic material of the porous layer PRL and the organic material of the second insulating interlayer IL2 may be prevented.

Although not shown in figures, an organic layer, such as an insulating layer or an alignment layer, may be further disposed above the porous layer PRL, and the second inorganic layer CPL2 disposed on the porous layer PRL may prevent the porous layer PRL from reacting with components disposed above the porous layer PRL.

Referring to FIG. 7, the second insulating interlayer IL2 may be a color filter CF according to an exemplary embodiment. The color filter CF may include an organic material and may include at least one of a pigment and a dye, however, it should not be limited thereto or thereby. The color filter CF may be a blue, green, or red color filter. The color filter CF may be provided in different colors for each pixel area.

As the color filter CF is disposed under the liquid crystal layer 300, the color filter CF may be disposed closer to a backlight (not shown) that may be disposed under the first substrate 100 compared to an comparative case where the color filter CF is disposed on the liquid crystal layer 300. Therefore, the color reproducibility of the display device DD may be superior to the comparative case. In a case where the second insulating interlayer IL2 is the color filter CF, the porous layer PRL may include the first inorganic layer CPL1 to prevent the matrix MR from reacting with the color filter CF.

The color filter CF may be formed by depositing an organic material. The organic material may have fluidity before being cured or baked, and thus, the color filter CF may not be deposited in a uniform thickness. In this case, the porous layer PRL may serve as a planarization layer. For example, the first inorganic layer CPL1 of the porous layer PRL may serve as the planarization layer.

Figure 8:
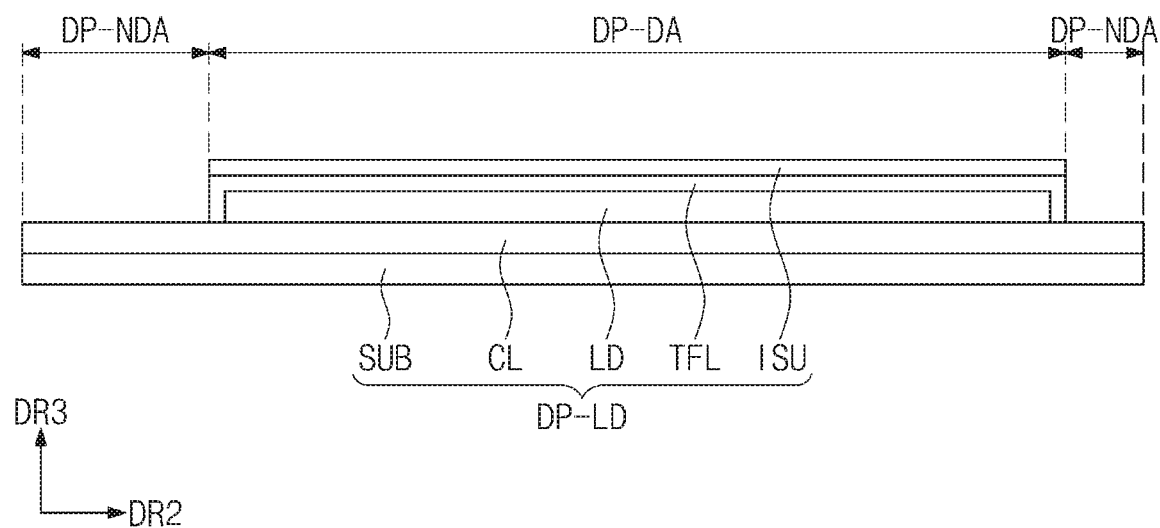
FIG. 8 is a cross-sectional view schematically showing a display panel according to an exemplary embodiment.
Figure 9:
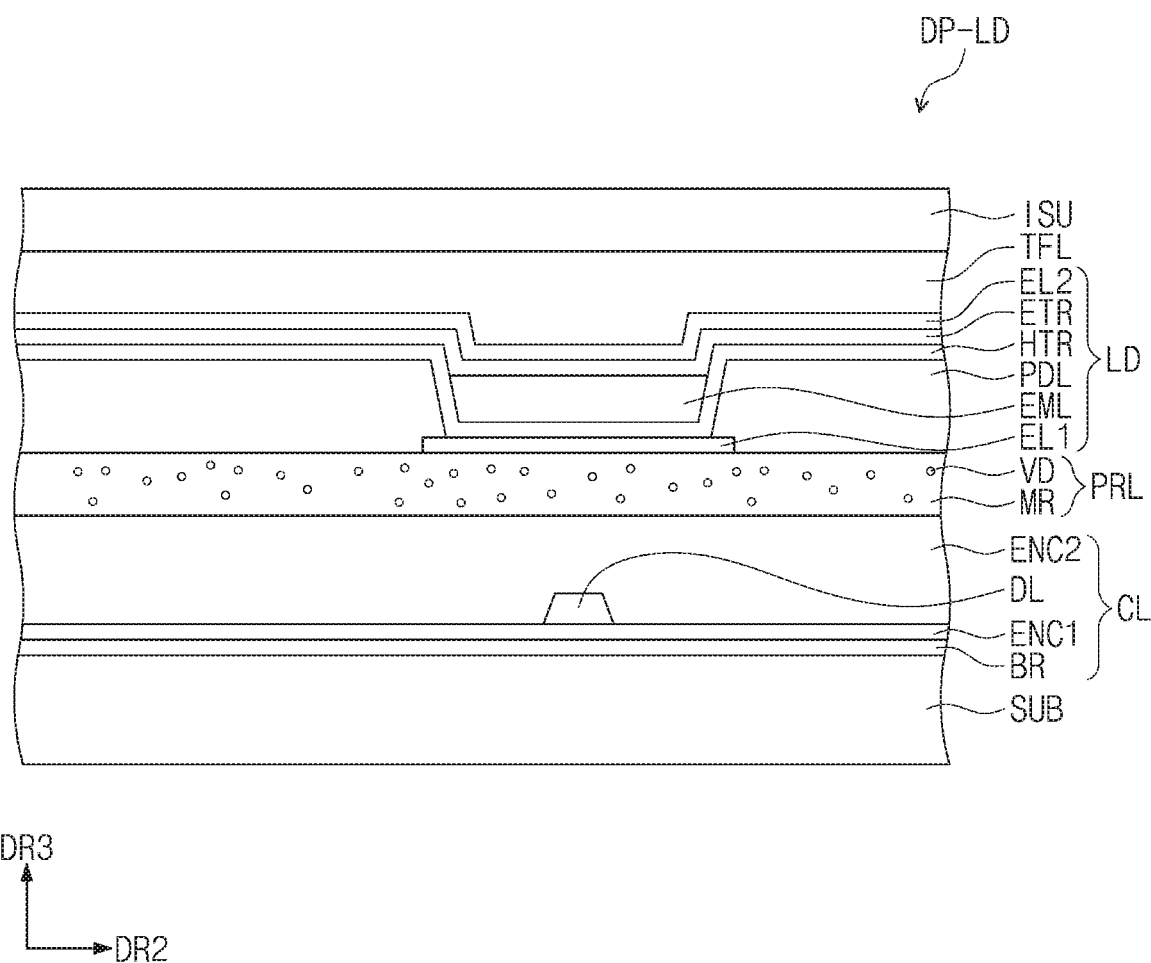
FIG. 9 is a cross-sectional view showing a portion of a display panel according to an exemplary embodiment.

FIG. 8 is a cross-sectional view schematically showing a display panel DP-LD according to an exemplary embodiment. FIG. 9 is a cross-sectional view showing a portion of the display panel DP-LD according to an exemplary embodiment.

In FIG. 8, the display panel DP-LD includes a light emitting element layer LD. The display panel DP-LD may include a substrate SUB, a circuit element layer CL disposed on the substrate SUB, the light emitting element layer LD may be disposed on the circuit element layer CL, and an insulating layer TFL may be disposed on the light emitting element layer LD.

The display panel DP-LD may include a display area DP-DA and a non-display area DP-NDA. The display area DP-DA of the display panel DP-LD may correspond to the display area DA shown in FIG. 1. The non-display area DP-NDA may correspond to the non-display area NDA shown in FIG. 1.

The circuit element layer CL may include at least one intermediate insulating layer and a circuit element. The circuit element layer CL may have a configuration corresponding to that of the first substrate 100 described with reference to FIG. 5.

Referring to FIG. 9, the circuit element layer CL may include a buffer layer BR, a first insulating layer ENC1, a data line DL, and a second insulating layer ENC2. The first insulating layer ENC1, the data line DL, and the second insulating layer ENC2 may have the same structure and serve as those of the first intermediate insulating layer IL1, the first data line D1, and the second insulating layer IL2 described with reference to FIG. 5, respectively, and thus, details thereof will be omitted. Although not shown in figures, the circuit element layer CL may include substantially the same components as those of the first pixel transistor TR1 and the first gate line G1 shown in FIG. 5. The buffer layer BR may increase a bonding force between the substrate SUB (e.g., the first base layer BS1) and the semiconductor pattern (e.g., the first semiconductor pattern SP1). In particular, the buffer layer BR may be useful when the circuit element layer CL includes a transistor that has a top gate structure. The buffer layer BR may include a silicon oxide layer and/or a silicon nitride layer. In one embodiment, the silicon oxide layer and the silicon nitride layer may be alternately stacked with each other. According to an exemplary embodiment, the buffer layer BR may be omitted, the barrier layer BL (refer to FIG. 5) may be disposed instead of the buffer layer BR, or both the buffer layer BR and the barrier layer BL may be disposed.

The light emitting element layer LD may include a first electrode EL1, at least one of functional layers, and a second electrode EL2 that are sequentially stacked one on another. The first electrode EL1 may be a pixel electrode, and the second electrode EL2 may be a common electrode. The functional layers may include a hole transport region HTR, a light emitting layer EML, and an electron transport region ETR. Each of the functional layers may have a single-layer or multi-layer structure. Holes and electrons respectively injected through the first electrode EL1 and the second electrode EL2 may move along the hole transport region HTR and the electron transport region ETR and may generate excitons in the light emitting layer EML, and the excitons may be excited to emit light. The functional layers may include an organic material or an inorganic material.

Each of the functional layers may independently include an organic material or an inorganic material. For example, the light emitting layer EML may include an organic light emitting material, such as an anthracene derivative, a pyrene derivative, a fluoranthene derivative, a chrysene derivative, a dihydrobenzanthracene derivative, or a triphenylene derivative. The light emitting layer EML may include an inorganic light emitting material, such as a quantum dot or a quantum rod.

The insulating layer TFL may encapsulate the light emitting element layer LD. As an example, the insulating layer TFL may be a thin film encapsulation layer. The insulating layer TFL may protect the light emitting element layer LD from moisture, oxygen, and foreign substance such as dust particles. According to another exemplary embodiment, an encapsulation substrate may be used instead of the insulating layer TFL. In this case, the encapsulation substrate may face the substrate SUB, and the circuit element layer CL and the light emitting element layer LD may be disposed between the encapsulation substrate and the substrate SUB.

The display panel DP-LD may include an input sensing layer ISU. The input sensing layer ISU may sense an input applied thereto from the outside. The input provided from the outside may be provided in a variety of types. For example, the input may include various types of external inputs including, but not limited to, a part of a user's body, a stylus pen, a light, a heat, or a pressure. In addition, a user's approaching or a proximity input (e.g., hovering) may be another type of the input in addition to a touch input by the part of the user's body.

The input sensing layer ISU may be disposed directly on the thin film encapsulation layer TFL without an adhesive layer being disposed between the thin film encapsulation layer TFL and the input sensing layer ISU. The input sensing layer ISU may include an insulating layer (not shown) disposed at a lowermost position thereof. In the present exemplary embodiment, the input sensing layer ISU may be manufactured through successive processes together with the components disposed thereunder. However, the present disclosure should not be limited thereto or thereby, and the input sensing layer ISU may be provided as a separate layer and may be coupled to the display panel DP-LD by an adhesive layer. In some embodiments, the input sensing layer ISU may be omitted.

A capacitance may be generated between the electrical signal generated by the circuit element layer CL and the first electrode EL1, and as a result, a crosstalk therebetween may occur.

Since the porous layer PRL is disposed between the circuit element layer CL and the light emitting element layer LD, the occurrence of the crosstalk may be reduced or prevented. Due to the crosstalk, a voltage variation may occur in a portion of the first electrode EL1 that overlaps the first data line D1 and the second data line D2 in a plan view, and a brightness may get out of the target range deteriorating the display quality of the display device DD. The display device DD including the porous layer PRL may prevent or alleviate the crosstalk phenomenon.

For the same reason as mentioned above, the display device DD may prevent or alleviate the crosstalk occurrence between the circuit element layer CL and the second electrode EL2 and between the circuit element layer CL and the input sensing layer ISU.

FIGS. 10A to 10D are cross-sectional views showing a method of manufacturing the display device DD according to an exemplary embodiment. Hereinafter, the manufacturing method of the display device DD will be described in detail with reference to FIGS. 10A to 10D. In FIGS. 10A to 10D, the same reference numerals denote the same elements described above, and details thereof will be omitted.

The manufacturing method of the display device DD may include providing the first base layer BS1, providing the first pixel transistor TR1, the first gate line G1 electrically connected to the first pixel transistor TR1, and the first data line D1 electrically connected to the first pixel transistor TR1 on the first base layer BS1, providing the porous layer PRL on the first data line D1, and providing the first pixel electrode PE1 electrically connected to the first pixel transistor TR1 and overlapping the first pixel electrode PE1 in a plan view.

Figure 10A:
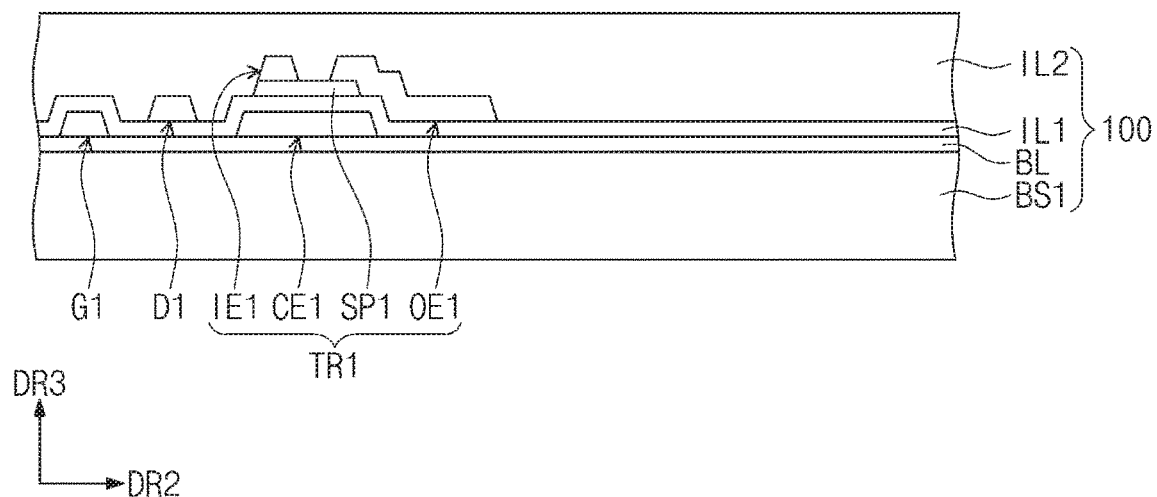
FIGS. 10A, 10B, 10C, and 10D are cross-sectional views showing a method of manufacturing a display device according to an exemplary embodiment.

Referring to FIG. 10A, the providing of the first substrate 100 may include the providing the first base layer BS1 and the providing the first pixel transistor TR1, the first gate line G1, and the first data line D1 on the first base layer BS1. The first gate line G1 is electrically connected to the first pixel transistor TR1, and the first data line D1 is electrically connected to the first pixel transistor TR1. The first gate line G1 and the first control electrode CE1 of the first pixel transistor TR1 may be formed by depositing a conductive layer using the same material in the same process and by patterning the conductive layer. The first data line D1, the first input electrode IE1, and the first output electrode OE1 may be formed by depositing another conductive layer using the same material in the same process and by patterning the conductive layer.

Figure 10B:
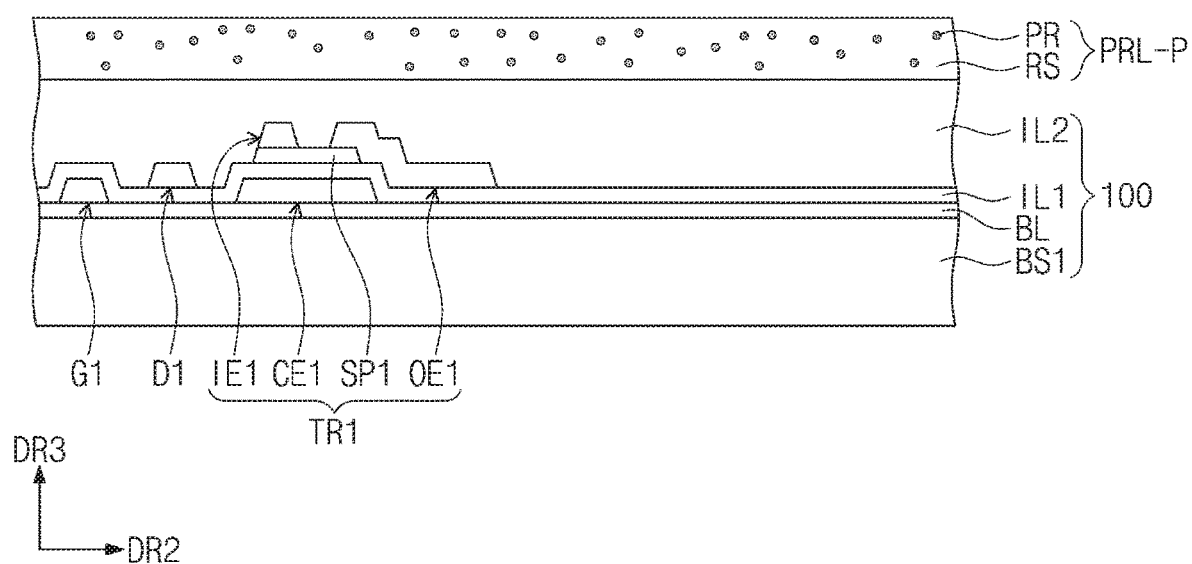
Figure 10C:
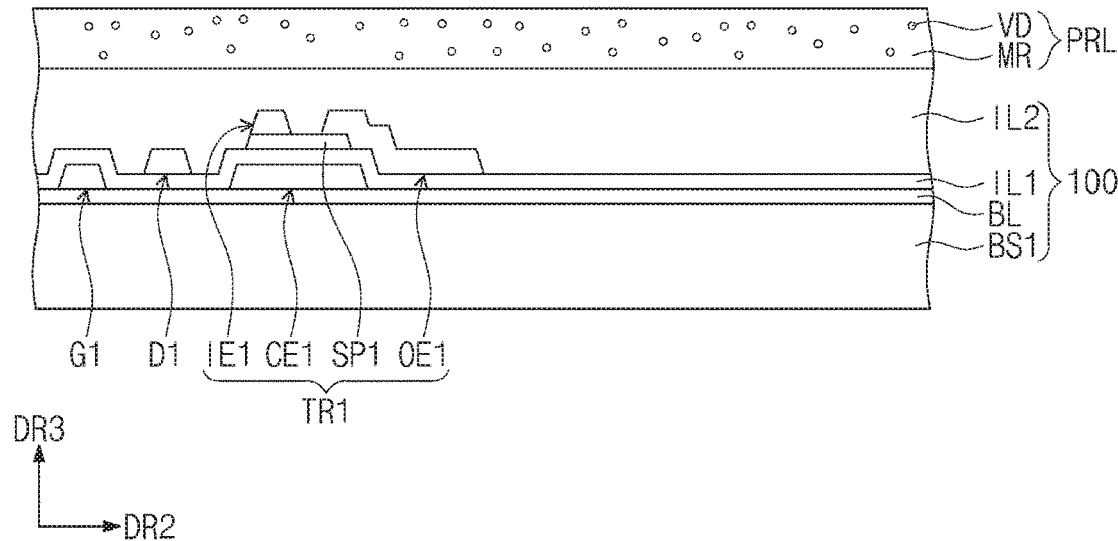

Referring to FIGS. 10B and 10C, the porous layer PRL is provided on the first substrate 100. In detail, FIG. 10B shows polymerizing a base resin RS and a porogen PR to form a preliminary porous layer PRL-P. FIG. 10C shows removing the porogen PR from the preliminary porous layer PRL-P to define the void portion VD.

Referring to FIG. 10B, the base resin RS and the porogen PR may be provided on the first substrate 100. The base resin RS may include at least one of a polysiloxane-based binder resin, a polyacrylic-based binder resin, a polyurethane-based binder resin, and a polyimide-based binder resin. The base resin RS may further include a reaction initiator. For example, the base resin RS may include at least one of a photo initiator and a thermal initiator.

The porogen PR may be provided as being dispersed in the base resin RS. The porogen PR may be uniformly dispersed in the base resin RS.

The porogen PR may be a particle added to define the void portion VD in a dielectric component. The porogen PR added to the dielectric component may be removed. Accordingly, the void portion VD may be defined in the dielectric component by the porogen PR that is removed. The porogen PR may be an organic polymer particle and may be easily removed by a heat treatment, a light treatment, or a chemical treatment.

The porogen PR may have a variety of shapes, such as a linear shape, a spherical shape, a quasi-spherical shape, a polygonal shape, or a dendrimer shape. The porogen PR may have a symmetrical shape, however, the present embodiment should not be limited to the symmetrical shape. In one embodiment, the porogen PR may have an asymmetrical shape. The porogen PR may have a diameter equal to or greater than about 2 nanometers and equal to or smaller than about 10 nanometers. The diameter of the porogen PR having a non-spherical shape may be measured using a spherical shape that has the same volume as the porogen PR. According to an exemplary embodiment, the volume of the porogen PR may be within a range equal to or greater than about 0.03 $\mu m^3$ or equal to or smaller than about 0.6 $\mu m^3$.

The material for the porogen PR should not be particularly limited and may include an organic polymer material.

For example, the linear-shaped porogen PR may be a single molecule of hydrocarbon that is represented by

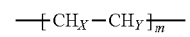

(each of x, y, and m is an integer equal to or greater than about 1), or may be branched poly (p-xylene), linear poly (p-phenylene), linear polybutadiene, branched polyethylene, polycarbonates, polyamideimide, polyphthalamide, or polymethylstyrene.

In addition, the dendrimer-shaped porogen PR may include a core portion and branch portions that are coupled to the core portion and connected to each other in a regular branch structure while extending outward. Examples of the core portion of the dendrimer-shaped porogen PR may include, but are not limited to, cyclosiloxane, cyclodextrin, or benzene. In addition, examples of the branch portion of the dendrimer-shaped porogen PR may include, but are not limited to, hydrocarbon groups that are represented by

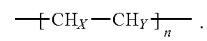

In one embodiment, the dendrimer-shaped porogen (PR) may include an aromatic core and a substituent that surrounds the aromatic core. For example, the aromatic core may contain an aryl group such as a benzene ring. As another example, the aromatic core may include a heteroaryl group. The substituent surrounding the core may be a substituted or unsubstituted chain hydrocarbon derivative. The substituent surrounding the core may contain a substituent capable of hydrogen bonding, such as a hydroxyl group or an amino group, at an end thereof. Accordingly, the porogen PR may be bonded to the base resin RS by strong hydrogen bonding.

As another example, the porogen PR may include an aliphatic core and a substituent that surrounds the aliphatic core. For example, the aliphatic core may contain an ether group. The substituent surrounding the aromatic core may be substantially similar to the substituent surrounding the aliphatic core.

For example, the porogen PR may be represented by the following chemical formula (a) or (b).

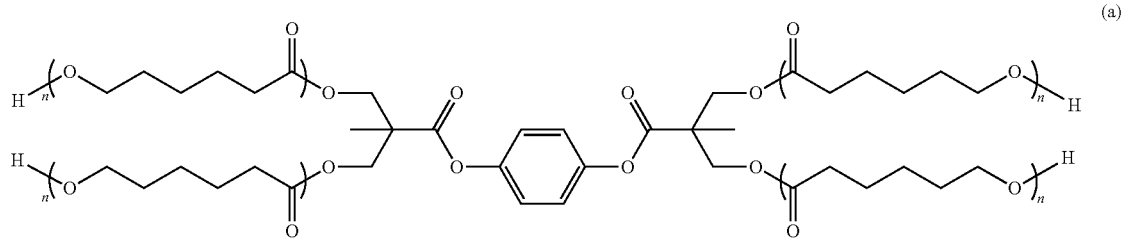

(b)

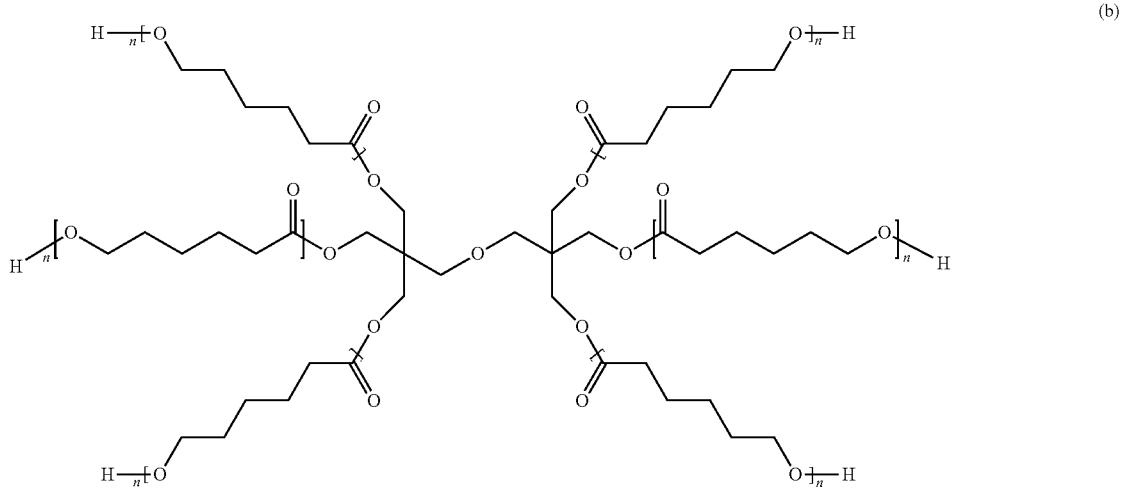

In the chemical formulas (a) and (b), n may be 1 or more and 10 or less.

In one embodiment, two or more different porogens PR may be provided in the base resin RS. A weight ratio of the porogen PR may be equal to or greater than about 1% and equal to or smaller than about 50% with respect to a total weight of the base resin RS and the porogen PR. In one embodiment, the weight ratio of the porogen PR may be equal to or greater than about 10% and equal to or smaller than about 50% of the total weight. When the porogen PR is included in the weight ratio of less than about 10%, the dielectric constant of the porous layer PRL that is formed later may not be reduced sufficiently. When the porogen PR is included in the weight ratio of more than about 50%, the durability of the porous layer PRL formed later may be compromised, or external moisture or air may enter the first substrate 100.

In an exemplary embodiment, light or heat may be applied to the base resin RS and the porogen PR to induce a graft polymerization reaction, and the preliminary porous layer PRL-P may be formed. In another embodiment, the base resin RS and the porogen PR may be bonded to each other by the strong hydrogen bonding rather than the graft polymerization.

When the base resin BR and the porogen PR are graft-polymerized with each other, it may be represented by the following chemical formula [A-1]. The base resin BR is represented by polysiloxane by way of an example.

[A-1]

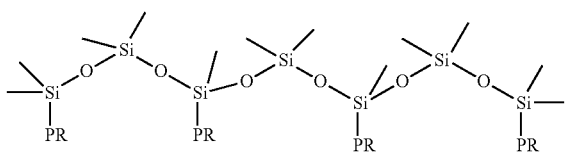

When the base resin BR and the porogen PR are bonded to each other by the hydrogen bonding, it may be represented by the following chemical formula [A-2]. The base resin BR is represented by polysiloxane by way of an example.

[A-2]

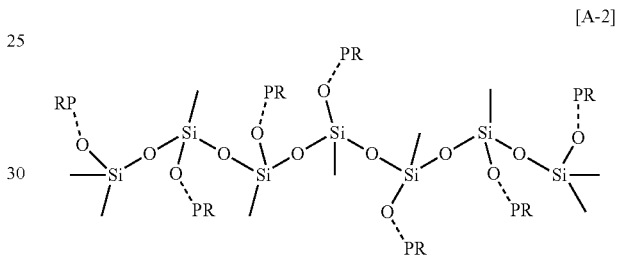

Although not shown in FIGS. 10A to 10D, the manufacturing method may further include forming the first inorganic layer CPL1 (refer to FIG. 7) before providing the base resin RS and the porogen PR. The manufacturing method may further include forming the second inorganic layer CPL2 after removing the porogen PR from the preliminary porous layer PRL-P.

Referring to FIG. 10C, the porous layer PRL may be formed by removing the porogen PR from the preliminary porous layer PRL-P. The method of removing the porogen PR should not be particularly limited, and the porogen PR may be removed by various treatments including, but not limited to, a heat treatment, a light treatment, and/or a chemical treatment.

Figure 10D:
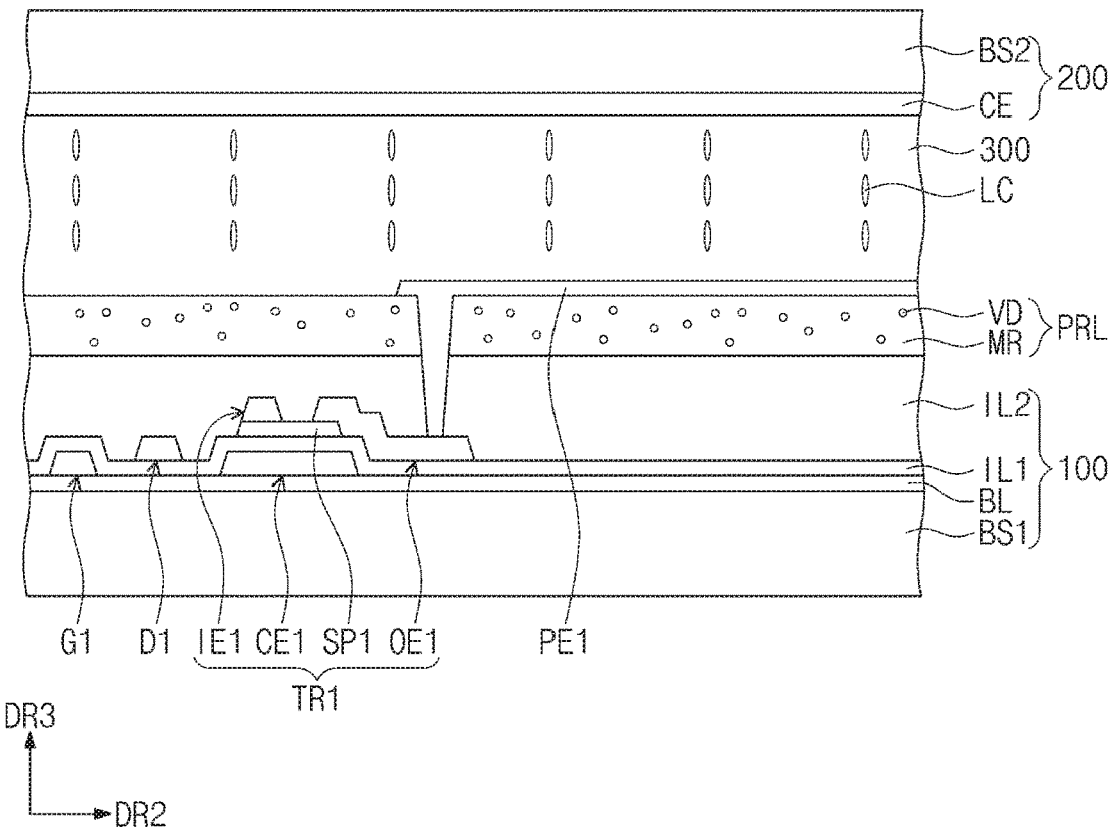

Referring to FIG. 10D, the first pixel electrode PE1 may be disposed on the porous layer PRL. Referring to FIG. 4, the first pixel electrode PE1 may be disposed to overlap the first data line D1 and the second data line D2 in a plan view. The first pixel electrode PE1 may be electrically connected to the first output electrode OE1 of the first pixel transistor TR1 through a contact hole that penetrates through the porous layer PRL and the second insulating interlayer IL2. The liquid crystal layer 300 and the second substrate 200 may be sequentially formed on the first pixel electrode PE1. According to an embodiment, the light emitting element layer LD (refer to FIG. 9) may be formed instead of the liquid crystal layer 300.

Referring to FIGS. 4, 10A to 10D, the manufacturing method of the display device DD may further include providing the second pixel electrode PE2 that is spaced apart from the first pixel electrode PE1 in the first direction DR1, a second pixel transistor TR2 that is electrically connected to the second pixel electrode PE2, the second gate line G2 that is electrically connected to the second pixel transistor TR2, and the second data line D2 that is electrically connected to the second pixel transistor TR2 and overlaps the first pixel electrode PE1 in a plan view.

Hereinafter, the display device DD according to the exemplary embodiment of the present disclosure will be described in detail with reference to embodiment examples and comparative examples. In addition, embodiments shown below are examples to facilitate understanding of the inventive concept of the present disclosure, and the scope of the present disclosure should not be limited thereto or thereby.

The preliminary porous layer PRL-P according to the exemplary embodiment of the present disclosure may be polymerized, for example, as describe below. However, the polymerization method of the preliminary porous layer PRL-P according to the exemplary embodiment of the present disclosure should not be limited thereto or thereby.

1. Polymerization Method of the Preliminary Porous Layer PRL-P

The polysiloxane and the porogen PR may be added into a round flask. In this case, the porogen PR may be added to maintain an equivalent weight ratio of the polysiloxane to the porogen PR at about 1:8. The mixture may be stirred at a room temperature for at least about 8 hours to allow sufficient reaction to occur. After obtaining a mixed solution of the porogen PR and the polysiloxane in which the porogen PR and the polysiloxane are bonded to each other by the strong hydrogen bonding, a solvent may be added into the mixed solution and coated on a silicon wafer substrate. Thereafter, a process of applying a predetermined heat may be performed to remove the porogen PR, and pores or the void portion VD formed by the removed porogen PR may be obtained.

2. Evaluation of the Dielectric Constant of the Porous Layer PRL

Table 1 below shows example results of evaluating the dielectric constant of the porous layer PRL according to embodiment examples 1 to 6 and comparative examples 1 and 2 by varying a material of the matrix MR and a volume ratio of the void portion VD.

The porous layer PRL of embodiment examples 1 and 4 may be formed by adding the porogen PR of about 10 weight percentage (wt %) to form the preliminary porous layer PRL-P and removing the porogen PR from the preliminary porous layer PRL-P. The porous layer PRL of embodiment examples 2 and 5 may be formed by adding the porogen of about 2 wt % to form the preliminary porous layer PRL-P and removing the porogen from the preliminary porous layer PRL-P. The porous layer PRL of embodiment examples 3 and 6 may be formed by adding the porogen of about 30 wt % to form the preliminary porous layer PRL-P and removing the porogen from the preliminary porous layer PRL-P. The porous layer PRL of comparative examples 1 and 2 may be formed by forming the preliminary porous layer PRL-P without adding the porogen PR and curing the preliminary porous layer PRL-P.

TABLE 1

|  | Material of matrix | Volume ratio of void portion | Dielectric constant |
| --- | --- | --- | --- |
| Embodiment example 1 | Polysiloxane resin | 10% | 2.74 |
| Embodiment example 2 | Polysiloxane resin | 20% | 2.14 |

TABLE 1-continued

|  | Material of matrix | Volume ratio of void portion | Dielectric constant |
| --- | --- | --- | --- |
| Embodiment example 3 | Polysiloxane resin | 30% | 1.73 |
| Embodiment example 4 | Polyacrylic resin | 10% | 3.12 |
| Embodiment example 5 | Polyacrylic resin | 20% | 2.41 |
| Embodiment example 6 | Polyacrylic resin | 30% | 2.10 |
| Comparative example 1 | Polysiloxane resin | 0% | 3.10 |
| Comparative example 2 | Polyacrylic resin | 0% | 3.40 |

Referring to Table 1, in embodiment examples 1 to 6 and comparative examples 1 and 2, the dielectric constant of the porous layer PRL decreases as the volume ratio of the void portion VD increases. Accordingly, since the porous layer PRL has a low dielectric constant by including the void portion VD, the crosstalk may be effectively alleviated or prevented compared with the comparative examples 1 and 2 that do not include the void portion VD. The display device DD according to the exemplary embodiment may include the porous layer PRL that is disposed between a data line and a pixel electrode. Therefore, the crosstalk occurring at a position adjacent to the data line and the pixel electrode of the display device DD may be alleviated, and the display device DD may display sharp images.

The manufacturing method of the display device DD according to the exemplary embodiment may include providing the porous layer PRL between a data line and a pixel electrode. The crosstalk of the display device DD manufactured by the manufacturing method may alleviated, and thus the display device DD may display sharp images.

Although the exemplary embodiments of the present disclosure have been described, it is understood that the present disclosure should not be limited to these exemplary embodiments, and various changes and modifications can be made by one ordinary skilled in the art within the spirit and scope of the present disclosure. Therefore, the subject matter disclosed herein should not be limited to any particular embodiment described herein, and the scope of the present inventive concept shall be determined according to the attached claims.

What is claimed is:

1. A display device comprising:
a base layer;
a first pixel transistor disposed on the base layer;
a first gate line electrically connected to the first pixel transistor;
a first data line electrically connected to the first pixel transistor;
a first insulating layer disposed on the first data line, having an uneven surface, and having a planar surface disposed between the base layer and the uneven surface, wherein the uneven surface overlaps the planar surface;
a first pixel electrode electrically connected to the first pixel transistor and overlapping the first data line in a plan view; and
a porous layer disposed between the first data line and the first pixel electrode,
wherein the porous layer comprises:
a matrix comprising a polymer resin and having a planar face, the planar face overlapping each of the uneven surface of the first insulating layer and the planar surface of the first insulating layer; and a plurality of void portions disposed in the matrix and disposed between the uneven surface of the first insulating layer and the planar face of the matrix of the porous layer, wherein the plurality of void portions have a volume ratio 10% of a total volume including the matrix and the plurality of void portions.

2. The display device of claim 1, wherein the polymer resin comprises at least one of a polysiloxane-based resin and a polyacrylic-based resin.

3. The display device of claim 1, further comprising: a first inorganic layer disposed directly on the matrix and disposed between the matrix and the first pixel electrode.

4. The display device of claim 1, further comprising:
a second pixel electrode spaced apart from the first pixel electrode in a first direction;
a second pixel transistor electrically connected to the second pixel electrode;
a second gate line electrically connected to the second pixel transistor; and
a second data line electrically connected to the second pixel transistor,
wherein the second data line overlaps the first pixel electrode and the second pixel electrode.

5. The display device of claim 1, further comprising a second insulating layer, wherein the first pixel transistor comprises:
a control electrode disposed on the base layer and extending from the first gate line;
an input electrode extending from the first data line; and
an output electrode electrically connected to the first pixel electrode, and
wherein the second insulating layer covers the control electrode, the first insulating layer is disposed on the second insulating layer to insulate the first data line, the input electrode, and the output electrode, and the porous layer is disposed on the first insulating layer.

6. The display device of claim 1, wherein the porous layer further comprises:
a first inorganic layer disposed between the matrix and the first insulating layer and having an uneven surface matching the uneven surface of the first insulating layer; and
a second inorganic layer disposed directly on the matrix, disposed between the matrix and the first pixel electrode, and having a uniform thickness.

7. The display device of claim 6, wherein the inorganic layer comprises at least one of silicon oxide, silicon nitride, or silicon oxynitride.

8. The display device of claim 1, wherein the first insulating layer is a color filter that comprises at least one of a pigment and a dye.

9. The display device of claim 1, wherein polymer resin comprises a fluorine-substituted group.

10. The display device of claim 1, further comprising a layer disposed on the first pixel electrode and comprising at least one of a liquid crystal molecule and a light emitting material.

11. The display device of claim 1, wherein the porous layer has a thickness equal to or greater than about 1 μm and equal to or smaller than about 5 μm.

12. The display device of claim 1, wherein a volume of each of the plurality of void portions is equal to or greater than about 0.03 $\mu m^3$ and equal to or smaller than about 0.6 $\mu m^3$.

13. The display device of claim 1, wherein a dielectric constant of the porous layer is 3.12.

14. The display device of claim 1, wherein the uneven surface is spaced from the planar surface and is of exactly one color, and wherein the first pixel electrode overlaps the uneven surface.

15. A display device comprising:
a base layer;
a transistor disposed on the base layer;
an insulating layer disposed on the transistor, having an uneven surface, and having a planar surface disposed between the base layer and the uneven surface, wherein the uneven surface overlaps the planar surface, is spaced from the planar surface, and is of exactly one color;
a pixel electrode electrically connected to the transistor and overlapping the uneven surface; and
a porous layer disposed between the transistor and the pixel electrode,
wherein the porous layer comprises:
a matrix comprising a polymer resin and having a planar face, the planar face overlapping each of the uneven surface of the insulating layer and the planar surface of the insulating layer; and
a plurality of void portions disposed in the matrix and disposed between the uneven surface of the insulating layer and the planar face of the matrix of the porous layer, and
wherein the plurality of void portions have a volume ratio 10% of a total volume including the matrix and the plurality of void portions.

16. The display device of claim 15, further comprising:
a gate line electrically connected to the transistor; and
a data line electrically connected to the transistor and overlapping the pixel electrode in a plan view.

17. The display device of claim 15, wherein the polymer resin comprises a polysiloxane-based resin.

18. A method of manufacturing a display device, comprising:
providing a first substrate comprising a base layer, a first pixel transistor disposed on the base layer, a first gate line electrically connected to the first pixel transistor, and a first data line electrically connected to the first pixel transistor;
providing an insulating layer on the first data line, the insulating layer having an uneven surface and having a planar surface disposed between the base layer and the uneven surface, wherein the uneven surface overlaps the planar surface, is spaced from the planar surface, and is of exactly one color;
providing a porous layer on the first substrate; and
providing a first pixel electrode electrically connected to the first pixel transistor, overlapping the uneven surface, and overlapping the first data line in a plan view,
wherein the providing of the porous layer comprises:
polymerizing a base resin and a porogen to form a preliminary porous layer on the uneven surface of the insulating layer; and
removing the porogen from the preliminary porous layer to form the void portion, wherein the porous layer has a planar face, the planar face overlapping each of the planar surface of the insulating layer and the uneven surface of the insulating layer, and
wherein the porogen have a volume ratio 10% of a total volume including the base resin and the porogen.

19. The method of claim 18, wherein the porogen has a volume equal to or greater than about 0.03 $\mu m^3$ or equal to or smaller than about 0.6 $\mu m^3$.

20. The method of claim 18, further comprising: providing a second pixel electrode spaced apart from the first pixel electrode in a first direction, a second pixel transistor electrically connected to the second pixel electrode, a second gate line electrically connected to the second pixel transistor, and a second data line electrically connected to the second pixel transistor and overlapping the first pixel electrode.

* * * * *